Aug. 4, 1931.  F. GRAF  1,817,366

ELECTRIC HOT WATER DISTRIBUTOR

Filed Nov. 12, 1925

F. Graf
Inventor

By: Marks & Clerk
Attys

Patented Aug. 4, 1931

1,817,366

UNITED STATES PATENT OFFICE

FRANZ GRAF, OF BADEN, SWITZERLAND

ELECTRIC HOT WATER DISTRIBUTOR

Application filed November 12, 1925, Serial No. 68,672, and in Germany December 22, 1924.

The type of electrical device used hitherto in the majority of cases for obtaining a hot water supply from a cold water main is a flow-through heating tube. With this an electric heating resistance was inserted in an enlarged section of the pipe before or after the tapping cock, and was surrounded by water. These heaters are not only comparatively expensive but have above all the disadvantage that the resistance or its casing in contact with the water gets incrusted with scale, which besides obstructing the transmission of heat from the resistance to the water, gradually reduces the passage of the water which in any case on account of the necessary velocity and magnitude of heat transmission must be kept as small as possible. The cleaning of the apparatus is a difficult work and requires taking it apart in any case.

The object of the present invention is to eliminate these drawbacks, by causing the water to flow freely, by gravity alone, over the electric heating unit after it has left the pressure supply.

The invention is clearly illustrated in the accompanying drawings, in which:—

Figure 1:
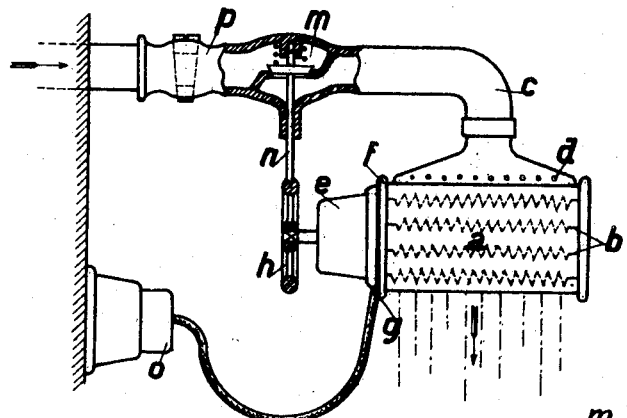
Fig. 1 is a side elevational view partly in section showing one form of the invention.

Referring now, more particularly, to the accompanying drawings especially Fig. 1 there is illustrated one type of construction of the improved hot water distributor. The heating unit $a$ which contains the heating element in the form of a resistance $b$ has the shape of a cylinder and is arranged below the opening $c$ of the cold water supply. A water distributor $d$ is secured to the latter, so that the water flows over the outer surface of the cylinder of the heating means $a$ in the form of a thin film. Should it be desired to receive the water in the form of a jet, a water collector is arranged underneath the heating element. The heating element is provided with guiding ribs $r$ which serve both to guide the water and to add to the heat transferring surface of the heater body.

Figure 2:
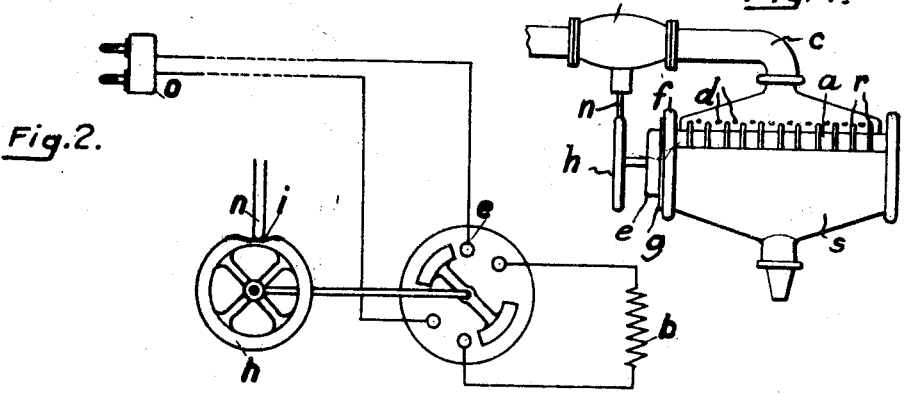
Fig. 2 is a diagrammatic view showing a switch and circuit used in connection with the distributor.
Figure 4:
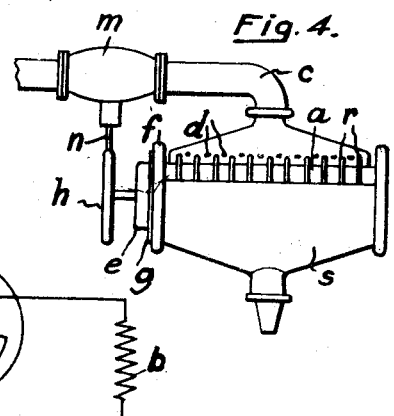
Figures 4 and 5 represent side and sectional views of the water heater complete with a collector and guiding ribs.
Figure 3:
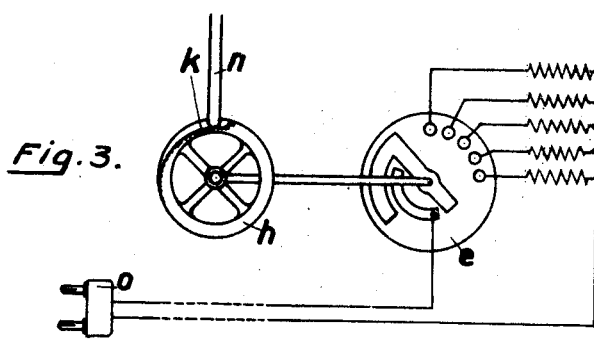
Fig. 3 is a diagrammatic view showing the modified form of circuit with a variable resistance.
Figure 5:
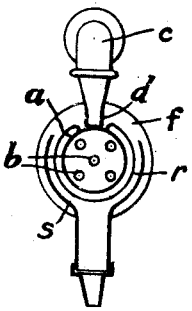

The electric switch is mechanically interlocked with the water valve after the well known principle. For practical and constructional reasons, a new arrangement has been provided which consists in that the turn type switch $e$ for the heating current is secured directly to the heating element $a$ on the side facing the water inlet. It is protected against the entrance of water by a flange $f$ and a rubber washer $g$. Its handwheel $h$ has a notch $i$ (Fig. 2) in which engages the spindle $n$ of the water inlet valve $m$ when the switch is open. If the latter is turned out of the cutting-out position, the valve $m$ is raised, and the water begins to flow If a curve $k$ as shown in Fig. 3 is provided instead of a simple notch $i$, the water supply can be regulated, and, when using a simple heating resistance $b$ as shown in Fig. 2, either a smaller quantity of hotter water can be obtained or a greater quantity of less hot water. It is also possible to graduate the resistance $b$ as shown in Fig. 3, in which case with a small opening of valve $m$ a smaller heating effect is produced than with a larger opening of valve $m$. To set once for all the water temperature to the desired value, an adjusting cock $p$ (Fig. 1), which may be sealed if desired, is arranged before the valve $m$. The current may most conveniently be taken from a plug contact $o$ arranged near the water tapping.

It must be understood that the design of the device may be varied from that particularly described without departing from the scope of the invention.

What I claim is:

1. An electrically heated device for obtaining a hot water supply from a cold water main, comprising in combination an electric heating unit including a heating element and an enclosing member therefor, a supply pipe for conveying the cold water from the main to the electric heating unit and a water distributor interposed between the supply pipe and the enclosing member of the heating unit and adapted to the shape of the latter for causing the cold water to flow in the form of a thin film externally over the outer surface of the said enclosing member of the heating unit only by gravity alone after it has left the said supply pipe, as set forth.

2. An electrically heated device for obtaining a hot water supply from a cold water main, comprising in combination an electric heating unit including a heating element and an enclosing member therefor, a supply pipe for conveying the cold water from the main to the enclosing member of the heating unit, means for causing the cold water to flow over the outer surface of the said enclosing member of the heating unit only by gravity alone after it has left the said supply pipe, and a water collector beneath the enclosing member opposite the opening of the supply pipe, as set forth.

3. An electrically heated device for obtaining a hot water supply from a cold water main, comprising in combination an electric heating unit including a heating element and an enclosing member, a supply pipe for conveying the cold water from the main to the enclosing member, means for causing the cold water to flow over the outer surface of the said enclosing member only by gravity alone after it has left the said supply pipe, and external guiding members on the ends of the enclosing member for guiding the flow of the water, as set forth.

4. An electrically heated device for obtaining a hot water supply from a cold water main, comprising in combination an electric heating unit including a heating element and an enclosing drum, a supply pipe for conveying the cold water from the main to the electric heating drum, means for causing the cold water to flow over the outer surface of the said electric heating drum only by gravity alone after it has left the said supply pipe, and flanges at the ends of the drum, which are of greater diameter than the said drum, for the purpose of keeping the end surfaces of the drum free from water, as set forth.

5. An electrically heated device or obtaining a hot water supply from a cold water main, comprising in combination an electric heating unit including a heating element and an enclosing drum, a supply pipe for conducting cold water from the main upon the heating drum, means for causing water to flow over the outer surface of said electric heating drum only by gravity after it has left the said supply pipe, flanges at the ends of the drum, said flanges being of greater diameter than the diameter of the drum to prevent water directed upon the drum from flowing upon the ends thereof, and a collector engaged with the drum and interposed between the flanges.

6. A heating device for obtaining a supply of hot water from a cold water main comprising in combination an electric heating unit including a heating element and an enclosing drum, means for conducting cold water from the main for discharge upon the drum to flow over the outer surface thereof, flanges upon the ends of the drum, and heat dissipating ribs extending partly around the drum, the edges of the flanges being extended beyond the plane of the edges of the ribs.

In testimony whereof I have signed my name to this specification.

FRANZ GRAF.